A
United States Patent

Fontana

[15] 3,687,241
[45] Aug. 29, 1972

[54] CASTER BRAKE
[72] Inventor: Frank J. Fontana, Stratford, Conn.
[73] Assignee: Stewart-Warner Corporation, Chicago, Ill.
[22] Filed: April 15, 1971
[21] Appl. No.: 134,191

[52] U.S. Cl. .................. 188/74, 16/35 D, 188/1 D, 188/29
[51] Int. Cl. ............................................. B60t 1/04
[58] Field of Search ............ 16/35 D; 188/1 D, 29, 74

[56] References Cited

UNITED STATES PATENTS

| 2,147,064 | 2/1939 | Schultz | 188/74 |
| 3,239,873 | 3/1966 | Fisher | 188/74 X |
| 3,388,419 | 6/1968 | Crawford | 188/1 D X |

FOREIGN PATENTS OR APPLICATIONS

| 298,456 | 7/1954 | Switzerland | 188/1 D |

Primary Examiner—Duane A. Reger
Attorney—Augustus G. Douvas, William J. Newman and Norton Lesser

[57] ABSTRACT

The following specification describes a caster in which a foot-operated treadle rotatable about the wheel axis pivots an L-shaped integral spring lever and brake into engagement with the caster wheel and thereafter tenses the spring lever to hold the treadle, lever and brake in their operated position until released.

7 Claims, 4 Drawing Figures

PATENTED AUG 29 1972　　　　　　　　　　　　　　3,687,241

INVENTOR
Frank J. Fontana

By *Norton Lesser*
Attorney

CASTER BRAKE

BACKGROUND OF THE INVENTION

1. Field of the Invention

This invention relates in general to caster wheel brakes and more particularly to a more economical and secure brake having improved appearance and long life for use on heavy duty casters.

2. Description of the Prior Art

Caster brakes are commonly used on heavy duty casters for holding the wheels stationary under large loads. Such brakes usually incorporate a treadle, which is foot operable for applying a brake force to the caster wheel, but are of complicated and expensive design. In addition, the brake assembly may required adjustment to compensate for wheel wear and sometimes requires close inspection to determine if the brake is engaged with or disengaged from the wheel.

SUMMARY OF THE INVENTION

The present invention proposes the use of a treadle pivotal about the wheel axis for swinging or pivoting an integrally formed spring wire lever and brake into or out of engagement with the caster wheel. The lever is pivotally supported in the spaced arms of the caster horn or yoke and is formed into a U-shaped brake arm between the horn arms so as to hide the brake from view. The lever extends downwardly from its pivot axis in the horn arms through an opening in a lip or right angle wall of the treadle. Opposite edges of the treadle opening engage the lever to pivot the same about the pivot axis in the horn arms to provide braking engagement of the U-shaped brake arm with the caster wheel or disengagement therefrom. As the brake arm of the lever engages the wheel to prevent further movement thereof, the lever arm is placed under tension in response to continued pivotal movement of the treadle to create pressure against the edge of the treadle opening for preventing brake release until a positive pivoting force is applied against the treadle for disengaging the brake. The length through which the lever is moved permits the brake to engage against the wheel through a wide range of wheel wear, and the position of the treadle enables facile determination of the brake position.

It is thereafore among the primary objects of the present invention to provide an improved and more economical brake for a caster wheel.

Other objects are features of the present invention will become apparent on examination of the following specification and claims together with the drawings.

DESCRIPTION OF THE PREFERRED EMBODIMENT

Figure 1:
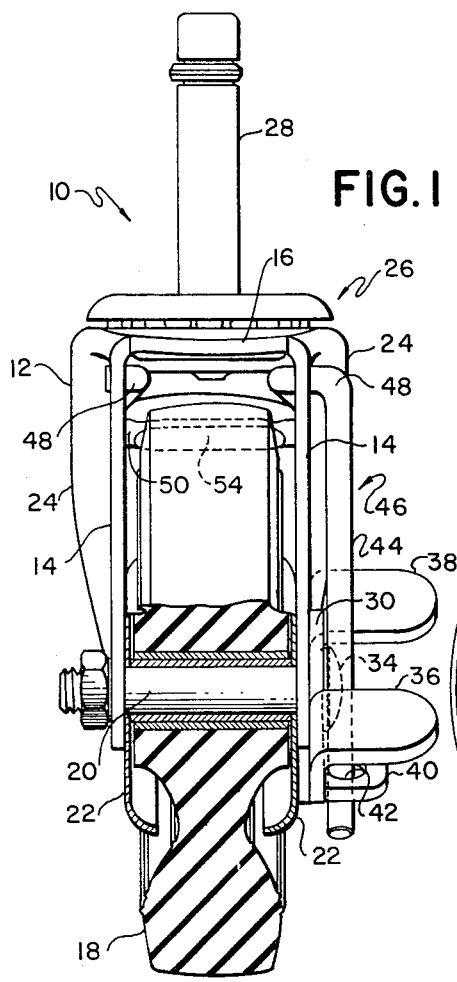
FIG. 1 is a front elevational view of a caster partially in section and a brake assembly employing the principles of the present invention.
Figure 2:
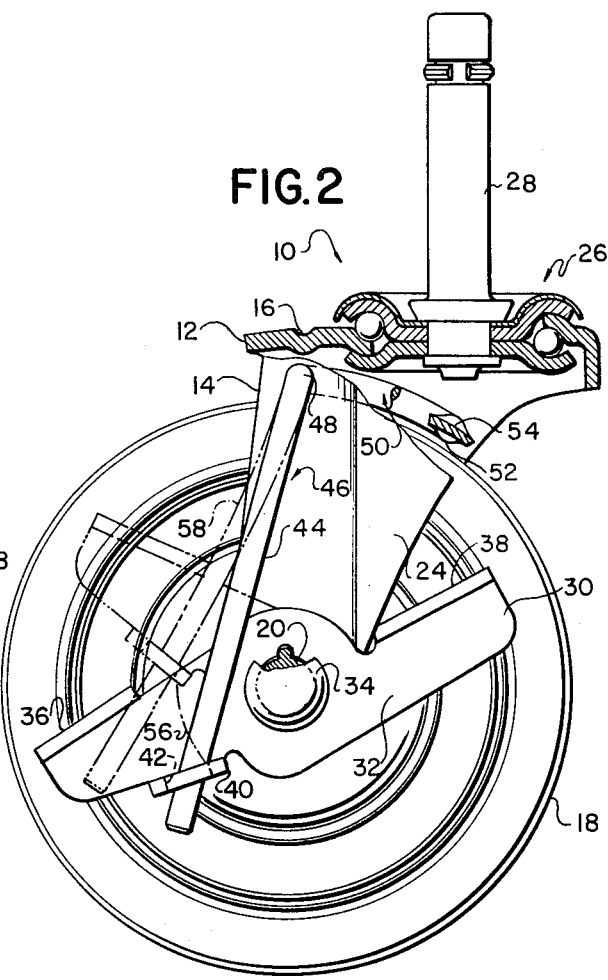
FIG. 2 is a side elevational view of the caster and brake assembly shown in FIG. 1 with broken lines indicating the operating positions of the brake treadle and lever.
Figures 3, 4:
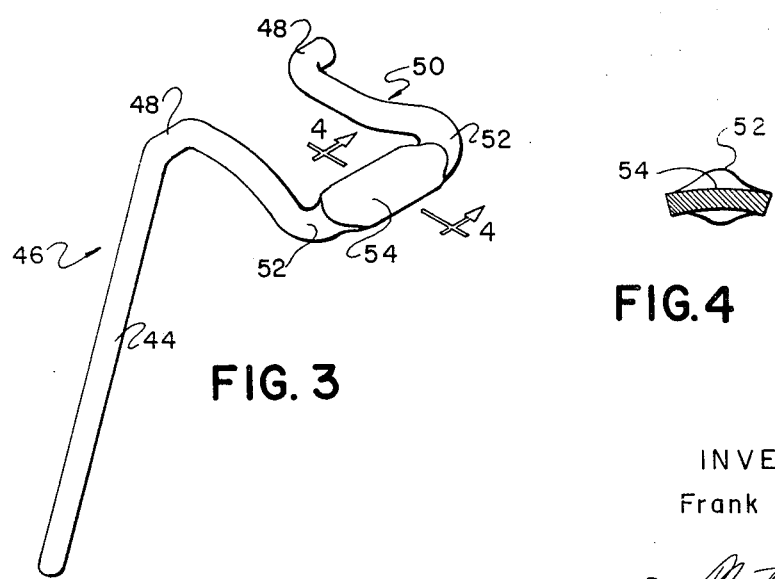
FIG. 3 is an isometric view of the lever arm and brake.
FIG. 4 is a sectional view taken along the line 4—4 in FIG. 3.

In FIGS. 1 and 2 a caster is indicated by the reference character 10. The caster comprises a yoke or U-shaped horn 12 having downwardly extending arms 14 and a back wall 16. A caster wheel 18 is mounted between the legs 14 by means of a pin 20 for rotation about a horizontal axis. A wheel cover 22 is located between each horn arm 14 and the adjacent side of wheel 18, and each horn arm 14 has a portion 24 flared axially outwardly of wheel 18 to the rear of pin 20.

A ball bearing assembly 26 pivotally supports a pintle or stem 28 on the back wall 16 of horn 12 to enable the horn 12 to pivot or rotate about a vertical axis offset from the wheel axis when the stem 28 is attached to a suitable structure for movably supporting the same.

A treadle 30 comprising a vertical plate 32 mounted for rotation on a shoulder of pin 20 adjacent the exterior surface of one of the legs 14 and is tightly or frictionally gripped by the head 34 on pin 20 and the adjacent leg 14. A short radial tang on the pin passing through horn leg 14 prevents relative rotation therebetween. A pair of spaced horizontal or right angle tabs 36 and 38 on treadle plate 32, disposed adjacent opposite ends of the upper edge of plate 32 and on opposite sides of the wheel axis, are engaged by the operator's foot or hand to rotate treadle 30. A lip or tab 40 located radially between the axis of pin 20 and the forward tab 36 and along the lower edge of plate 32 has an opening 42. The opening 42 receives the elongate leg 44 of an L-shaped integral cylindrical spring wire lever and brake 46.

The other leg 48 of the lever arm and brake 46 passes through aligned openings in horn arms 14 located between the wheel periphery and the horn back leg, and a U-shaped brake arm 50 is formed therein intermediate the ends of leg 58. The arm 50 has two side legs dimensioned and shaped to fit between the arms 14 and the back leg 52 of the U-shaped arm and is flattened to form a brake 54. The pivot axis for leg 48 is aligned in a general vertical plane passing through the axis of pin 20 and is located intermediate the periphery of wheel 18 and wall 16, with the brake 54 hidden or camouflaged by the horn and spaced approximately one-half the distance from the axis of leg 48 and the length of leg 44 to lip 40.

When the brake 54 is disengaged from the periphery of wheel 18, the treadle 32 and lever leg 44 are in the position shown by the full lines in FIG. 2 with the spring lever leg 44 engaged by the front edge portion of opening 42 adjacent the lower corner thereof. The lower corner of tab 38, as seen in FIG. 2, is engaged with the rear edge of outwardly flared portion 24 of the adjacent horn arm 14 so that further rotation of the treadle 32 or wire lever and brake 46 is prevented and the brake is held intermediate the wheel periphery and the horn back wall 16.

When the treadle 32 is pivoted clockwise as seen in FIG. 2, the rear edge of opening 42 moves to the position indicated by broken lines 56. The lever leg 44 is swung in the same direction by the rear edge of opening 42 to swing the brake 54 about the axis of leg 48 and place the brake 54 in engagement with the periphery of wheel 18. Since the brake 54 is then prevented from further movement while the treadle continues to pivot clockwise, the rear edge of opening 42 places the lever leg 44 under tension between the opening edge and the pivot axis of legs, as indicated by broken lines 58. When the pivoting force is removed from treadle 32, the tension in leg 44 is exerted almost perpendicularly to the radial line between the rear edge of opening 42 and the axis of pin 20 and across a very small area so that the frictional component between the lever arm 38 and the rear edge of opening 42 holds the brake 54 locked in its operated or engaged position. The brake is thus held locked operated since the lever leg 44 and brake 54 cannot move back to normal without applying sufficient force to relieve the tension on the wire lever leg 44. It will be noted that as the wheel diameter shortens due to wear, the brake 54 may still pivot into engagement therewith and be held locked operated.

To release the brake 54, the treadle 30 is rotated counterclockwise as seen in FIG. 2 to thereby release the tension on lever leg 44 and engage the front edge of opening 42 with leg 44 to pivot the lever counterclockwise and disengage the brake 54 from the wheel periphery. In either the brake off or brake on position, the treadle 30 is in a corresponding position which is easily determined visually or tactiley.

The foregoing is a description of an improved caster brake and although the inventive concept is not limited to the embodiment described, it is believed set forth in the following claims.

What is claimed is:

1. A caster brake for use with a caster having a wheel rotatably mounted between the side arms of a U-shaped caster horn pivotally carrying a pintle on the back arm of said horn, the improvement comprising an L-shaped wire lever having one leg extending through said horn side arms to form a pivot axis intermediate the periphery of said wheel and the back arm of said horn, a U-shaped bend in said one leg, a treadle, means mounting said treadle for rotational movement about the axis of said wheel, and means on said treadle engaging the other leg of said lever arm for pivoting said one leg about said axis for moving the back leg of said U-shaped bend into engagement with said wheel in response to rotation of said treadle in one direction towards a predetermined position with said lever other leg against said treadle tensed in response to said rotation to hold said treadle against rotation in the opposite direction and disengagement of said bend back leg from said wheel.

2. The caster brake claimed in claim 1 in which said lever pivot axis and said wheel axis lie in a generally common plane.

3. The caster brake claimed in claim 1 in which said U-shaped bend is located between said horn back arm and the periphery of said wheel.

4. The caster claimed in claim 3 in which said lever comprises a cylindrical wire and said back leg brake in said U-shaped bend includes a flattened portion extending axially of said wheel for engaging said wheel.

5. The caster claimed in claim 3 in which said means on said treadle comprises a lip having an opening therein for receiving the other leg of said lever.

6. The caster claimed in claim 5 in which the pivot axis of said wheel and said wire lever pivot axis lie in a common vertical plane and said opening receiving said other lever leg lies below said wheel pivot axis.

7. The brake claimed in claim 1 in which said treadle comprises a plate parallel and adjacent one of said horn arms with a pair of right angle tabs formed on said plate spaced on opposite sides of said wheel axis for facilitating rotation of said treadle, and a portion formed on said one arm flared axially outwardly of said wheel on one side of said wheel axis for engaging one of said tabs in response to rotation of said tab in one direction to a predetermined position for terminating said rotation in one direction.

* * * * *